United States Patent
Wan et al.

(10) Patent No.: US 12,540,087 B2
(45) Date of Patent: Feb. 3, 2026

(54) FOUNTAIN LAMP WITH DISINFECTION DEVICE

(71) Applicant: Shenzhen Haike Plastic Electronics Co., Ltd., Shenzhen (CN)

(72) Inventors: Gangbin Wan, Shenzhen (CN); Jianliang Xiong, Shenzhen (CN); Bin Xiong, Shenzhen (CN)

(73) Assignee: Shenzhen Haike Plastic Electronics Co., Ltd., Shenzhen (CN)

( * ) Notice: Subject to any disclaimer, the term of this patent is extended or adjusted under 35 U.S.C. 154(b) by 0 days.

(21) Appl. No.: 18/434,323

(22) Filed: Feb. 6, 2024

(65) Prior Publication Data

US 2025/0243092 A1   Jul. 31, 2025

(30) Foreign Application Priority Data

Jan. 30, 2024   (CN) .......................... 202410135997.5

(51) Int. Cl.
| | |
|---|---|
| *B05B 17/08* | (2006.01) |
| *C02F 1/68* | (2023.01) |
| *C02F 1/76* | (2023.01) |
| *C02F 103/42* | (2006.01) |
| *F21V 33/00* | (2006.01) |
| *C02F 103/00* | (2006.01) |

(52) U.S. Cl.
CPC .............. *C02F 1/685* (2013.01); *B05B 17/08* (2013.01); *C02F 1/76* (2013.01); *F21V 33/0004* (2013.01); *C02F 2103/007* (2013.01); *C02F 2103/42* (2013.01); *C02F 2201/002* (2013.01); *C02F 2209/40* (2013.01); *C02F 2303/04* (2013.01)

(58) Field of Classification Search
CPC ... B05B 17/08; F21W 2121/02; E04H 4/1281
See application file for complete search history.

(56) References Cited

U.S. PATENT DOCUMENTS

| | | | | |
|---|---|---|---|---|
| 5,320,449 | A * | 6/1994 | Demarteau | E04H 4/0006 4/491 |
| 5,476,116 | A * | 12/1995 | Price | E04H 4/1281 422/279 |
| 5,641,120 | A * | 6/1997 | Kuykendal | B05B 1/10 239/18 |
| 6,375,090 | B1 * | 4/2002 | Beidokhti | F21S 9/028 239/18 |
| 6,435,422 | B1 * | 8/2002 | Wutschik | B05B 17/08 239/18 |

(Continued)

*Primary Examiner* — Joseph A Greenlund

(57) ABSTRACT

A fountain lamp with a disinfection device includes a shell, a lighting component, and a pumping assembly. The shell is provided with a closed floating cavity in an upper part and a water outlet channel passing through the floating cavity. The water outlet channel is provided with a water spray hole at an upper end, and the shell is provided with a disinfecting cavity at a lower part and a first through hole at the lower part. The disinfecting chamber is for holding the disinfecting substance and immersing it in the water, and the first through hole is for allowing water to pass through. The lighting component is configured for projecting light to form a column of light. The pump component is for pumping water through the water outlet channel to the water spray hole to form a column of water.

17 Claims, 12 Drawing Sheets

(56) References Cited

U.S. PATENT DOCUMENTS

| | | | | |
|---|---|---|---|---|
| 6,755,349 | B2* | 6/2004 | Beidokhti | B05B 17/08 239/18 |
| 7,427,036 | B2* | 9/2008 | Skluzacek | B05B 17/08 239/18 |
| 7,754,072 | B2* | 7/2010 | Kelly | B05B 17/08 210/167.25 |
| 8,167,446 | B2* | 5/2012 | Wesselmeier | F21V 31/04 362/101 |
| 8,209,794 | B1* | 7/2012 | Harrison | G05D 9/12 340/618 |
| 8,215,569 | B2* | 7/2012 | Johnson | B05B 17/06 239/18 |
| 9,772,288 | B1* | 9/2017 | Lapota | G01N 21/645 |
| 10,435,901 | B1* | 10/2019 | Smith-Taylor | E04H 4/1281 |
| 11,267,001 | B2* | 3/2022 | Xu | F04D 29/528 |
| 11,530,789 | B2* | 12/2022 | Xu | C02F 1/688 |
| 11,772,118 | B2* | 10/2023 | Muck | F21V 33/00 239/289 |
| 11,878,319 | B2* | 1/2024 | Yeiser | B05B 17/08 |
| 2002/0116999 | A1* | 8/2002 | Heger | G05D 9/12 73/304 C |
| 2002/0179728 | A1* | 12/2002 | Beidokhti | B05B 17/08 239/20 |
| 2005/0077374 | A1* | 4/2005 | King | B01F 21/22 239/42 |
| 2006/0032123 | A1* | 2/2006 | Knighton | C02F 1/50 47/59 R |
| 2006/0163375 | A1* | 7/2006 | Skluzacek | B05B 17/08 239/18 |
| 2006/0243819 | A1* | 11/2006 | Beidokhti | B05B 17/08 239/18 |
| 2011/0240757 | A1* | 10/2011 | Selk | B05B 17/08 239/18 |
| 2011/0247970 | A1* | 10/2011 | Evingham | B01D 29/52 210/85 |
| 2014/0110352 | A1* | 4/2014 | King | C02F 1/505 222/173 |
| 2014/0203184 | A1* | 7/2014 | Purdy | G01N 33/18 250/393 |
| 2014/0205512 | A1* | 7/2014 | King | E04H 4/1281 422/265 |
| 2014/0262992 | A1* | 9/2014 | Adkins | A63G 21/18 210/97 |
| 2015/0227145 | A1* | 8/2015 | Reddy | G05D 9/12 137/391 |
| 2015/0322683 | A1* | 11/2015 | Edwards | E04H 4/1281 210/86 |
| 2017/0356209 | A1* | 12/2017 | He | C02F 1/688 |
| 2018/0112430 | A1* | 4/2018 | Shalon | E04H 4/1281 |
| 2019/0022603 | A1* | 1/2019 | Huang | C02F 1/688 |
| 2020/0290905 | A1* | 9/2020 | Dettorre | B01F 33/503 |
| 2020/0316620 | A1* | 10/2020 | Xu | F04D 29/528 |
| 2021/0102543 | A1* | 4/2021 | Reeves-Jackson | F04D 29/406 |
| 2021/0340786 | A1* | 11/2021 | Zhang | G01K 1/14 |
| 2022/0289592 | A1* | 9/2022 | Leung | C02F 1/001 |
| 2022/0341554 | A1* | 10/2022 | Xu | F21S 9/037 |
| 2024/0262722 | A1* | 8/2024 | Stevens | C02F 1/001 |

\* cited by examiner

FOUNTAIN LAMP WITH DISINFECTION DEVICE

CROSS-REFERENCE TO RELATED APPLICATIONS

The application claims priority of Chinese patent application CN2024101359975, filed on Jan. 30, 2024, which is incorporated herein by reference in its entireties.

TECHNICAL FIELD

The present invention relates to the technical field of lighting devices, and in particular to a fountain lamp with a disinfection device.

BACKGROUND ART

As an ornamental landscape light, fountain lamps are widely used in gardens, parks, fountains, aquariums, courtyard ponds, swimming pools and ponds. Floating fountain lamps that can float on the surface of the water in swimming pools and ponds, and etc., are especially favored because of their ease of movement, easy maintenance and other advantages.

At present, the existing floating fountain lamps on the market usually includes pumps, lights and shells. The shells form a floating cavity, so that the product floats on the water surface. The pump will pump water and launch the water column. The lighting, on the other hand, projects light into the water column. In order to ensure cleanliness in the pool, people often need to sterilize the pool. Existing floating fountain lamps usually do not have a disinfecting function, and people need to separately set up a pool disinfecting device, or regularly use the disinfecting device to disinfect and sterilize the water in the pool.

The present invention provides a fountain lamp with a disinfection device, which can effectively solve the above problems. The present fountain lamp has a simple structure, is easy to use, and can spray water and illuminate, as well as disinfect and purify water.

SUMMARY

A fountain lamp with a disinfection device includes a shell, a lighting component, and a pumping assembly. The shell is provided with a closed floating cavity in an upper part and a water outlet channel passing through the floating cavity. The water outlet channel is provided with a water spray hole at an upper end. The shell is provided with a disinfecting cavity at a lower part and a first through hole at the lower part. The first through hole is in communication with the disinfecting cavity. The shell is floatable on water under an action of the floating chamber, and the disinfecting chamber is for receiving disinfecting substance and immersing it in the water, and the first through hole is for allowing water to pass through. The lighting component is arranged inside the floating cavity and configured for projecting light to form a column of light. The pumping assembly is located at the lower part of the housing, and the pumping assembly is connected to the water outlet channel, and the pump component is used for pumping water through the water outlet channel to the water spray hole to form a column of water.

Further, the pumping assembly comprises a brushless pump and a detection switch, the detection switch is configured for detecting whether water enters the brushless pump and turning on or off the brushless pump.

Further, the lighting assembly comprises a first lighting device and a second lighting device, the first lighting device is provided on a side of the floating cavity close to the upper surface of the housing, the first lighting device is configured for producing a column of light through the top of the housing, the light column at least partially overlaps with the water column; the second lighting device is for generating light projected towards a side wall of the floating cavity, and the light at least partially penetrating out of the side wall of the floating cavity.

Further, the housing is further provided with an accommodation chamber and a second through hole in communication with the accommodation chamber, the accommodation chamber is disposed between the floating chamber and the disinfection chamber, the pumping assembly being disposed in the accommodation chamber, the second through hole being for allowing water to pass through.

Further, the fountain lamp further comprises a water outlet cover, the water spray holes being uniformly distributed in a circular shape along the surface of the water outlet cover, the water outlet cover is connected to the top of the housing and capped over the water outlet channel.

Further, the fountain lamp further includes a first sealing ring, wherein the housing is provided with a first sealing groove, the first sealing ring is inserted in the first sealing groove, the water outlet cover being pressed against the first sealing groove.

Further, the housing comprises a floating housing and a disinfection housing, the floating chamber is arranged in the floating housing, the disinfection chamber is arranged in the disinfection housing, the disinfection housing is connected to a lower part of the floating housing, the accommodation chamber being formed between the disinfection housing and the floating housing.

Further, the disinfection housing includes an upper disinfection housing and a lower disinfection housing, the upper disinfection housing sleeves the lower disinfection housing, the lower disinfection housing being slidable up and down with respect to the upper disinfection housing in order to change a disinfection volume of the disinfection chamber.

Further, the upper disinfection housing is provided with a first stop block in the lower part of the inner surface, the lower disinfection housing is provided with a second stop block in the upper part of the outer surface, and the first stop block abuts against the second stop block.

Further, the upper disinfection housing is provided with a first slider on an inner surface thereof, the second stop block is provided with a sliding hole, and the first slider is slidably disposed in the sliding hole so that the lower disinfection housing can slide relative to the upper disinfection housing.

As an improvement, the fountain lamp further includes a rotating housing, wherein the rotating housing is provided with a first opening, the upper disinfecting housing being provided with a second opening, the rotating housing being rotatably sleeved in the upper disinfecting housing and rotatable between an open position and a closed position rotating; in the open position, the first opening aligns with the second opening; and in the closed position, the first opening is staggered from the second opening, and the rotating housing covers the second opening.

As an improvement, the fountain lamp further includes an adjusting housing, wherein the adjusting housing is provided with adjusting holes, the adjusting housing rotatably nests the lower disinfection housing and is rotatable between an open position and a closed position; when in the open position, the adjusting holes align with the first through hole; in the closed position, the adjustment holes is misaligned with the first through hole, and the adjusting housing covers the first through hole.

Further, the lower disinfection housing is provided with a third through hole at a bottom of the lower disinfection housing, and the third through hole is in communication with the disinfection chamber.

Further, the lower disinfection housing is further provided with a curved rotation groove at a bottom of the lower disinfection housing, and the adjusting housing is provided with a second slider, and the second slider is slidably disposed in the rotation groove.

Further, a free end of the second slider is provided with a limiting block, and the limiting block abuts against the inner wall of the lower disinfection housing.

Further, the floating housing comprises an upper floating housing and a lower floating housing, the upper floating housing is connected to and capped in the lower floating housing, and the floating cavity is formed between the upper floating housing and the lower floating housing.

Further, the fountain lamp further comprises a second sealing ring, the upper floating housing is provided with a second sealing groove, the second sealing ring is arranged in the second sealing groove, the lower floating housing is inserted along the second sealing groove, and the lower floating housing abuts against the second sealing ring.

Further, the upper floating housing extends downwardly in the middle to form a connecting portion, the water outlet channel is provided in the connecting portion, the connecting portion is connected to the middle of the lower floating housing by a connecting member, and a third seal is provided between the connecting portion and the lower floating housing.

Further, the fountain lamp further comprises a blocking member, the blocking member being detachably connected to the lower surface of the outlet cover body and inserted into the outlet channel, so as to form a water outlet gap between the inner wall of the outlet channel and the outer wall of the blocking member, which is connected to the water spray hole of the water outlet gap.

Further, the inner wall of the accommodation chamber is provided with a snap-in member, and the snap-in member is engaged on the outer surface of the pumping assembly.

Further, the pumping assembly is provided with a filtering portion on a side near the water inlet, and the filtering portion is used for filtering impurities in the water.

The beneficial results of the present invention are as follows. When in use, the floating cavity is subjected to the buoyancy force of water, so that the product floats on the water, and the lower part of the shell is immersed in the water, and the pumping assembly works to pump the water through the water outlet channel to the water spray hole, forming a water column. The lighting components work to produce light projected to the top of the product to form light columns, light columns and water columns overlap to provide good lighting, decorative effect. Moreover, the light generated by the lighting component also passes through the side wall of the floating chamber and is projected on the water surface, providing additional lighting and decorative effects. The disinfecting cavity is provided with a disinfecting substance, and the disinfecting substance is immersed in the water, which can disinfect the water, and the first through-hole can allow the water to pass through, so that the disinfecting substance can spread with the water flow. The sanitizing substance is a chloride such as calcium hypochlorite, which can effectively provide chlorine ions to sanitize the water at the swimming pool and the like.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
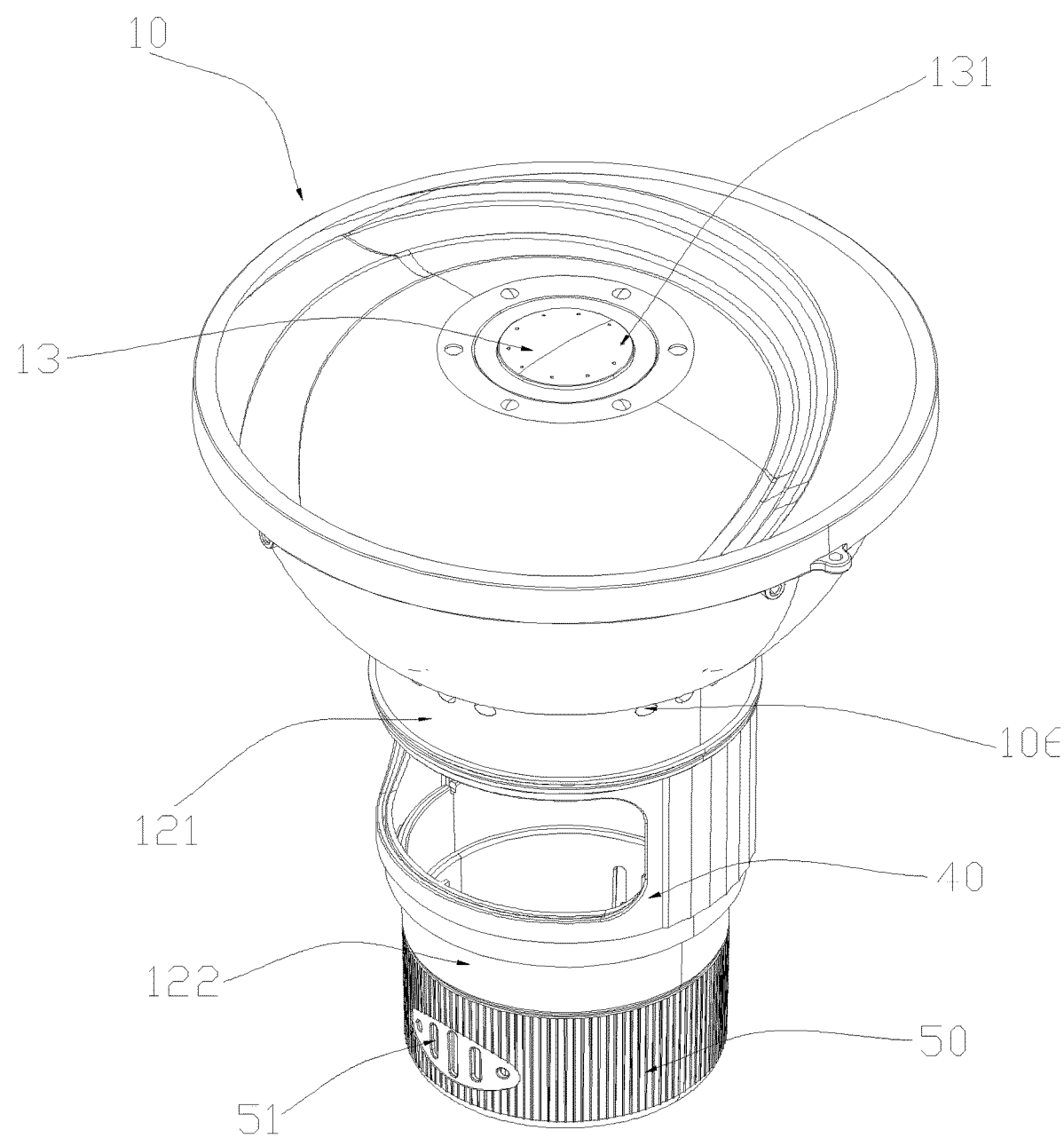
FIG. 1 is a schematic diagram of the overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
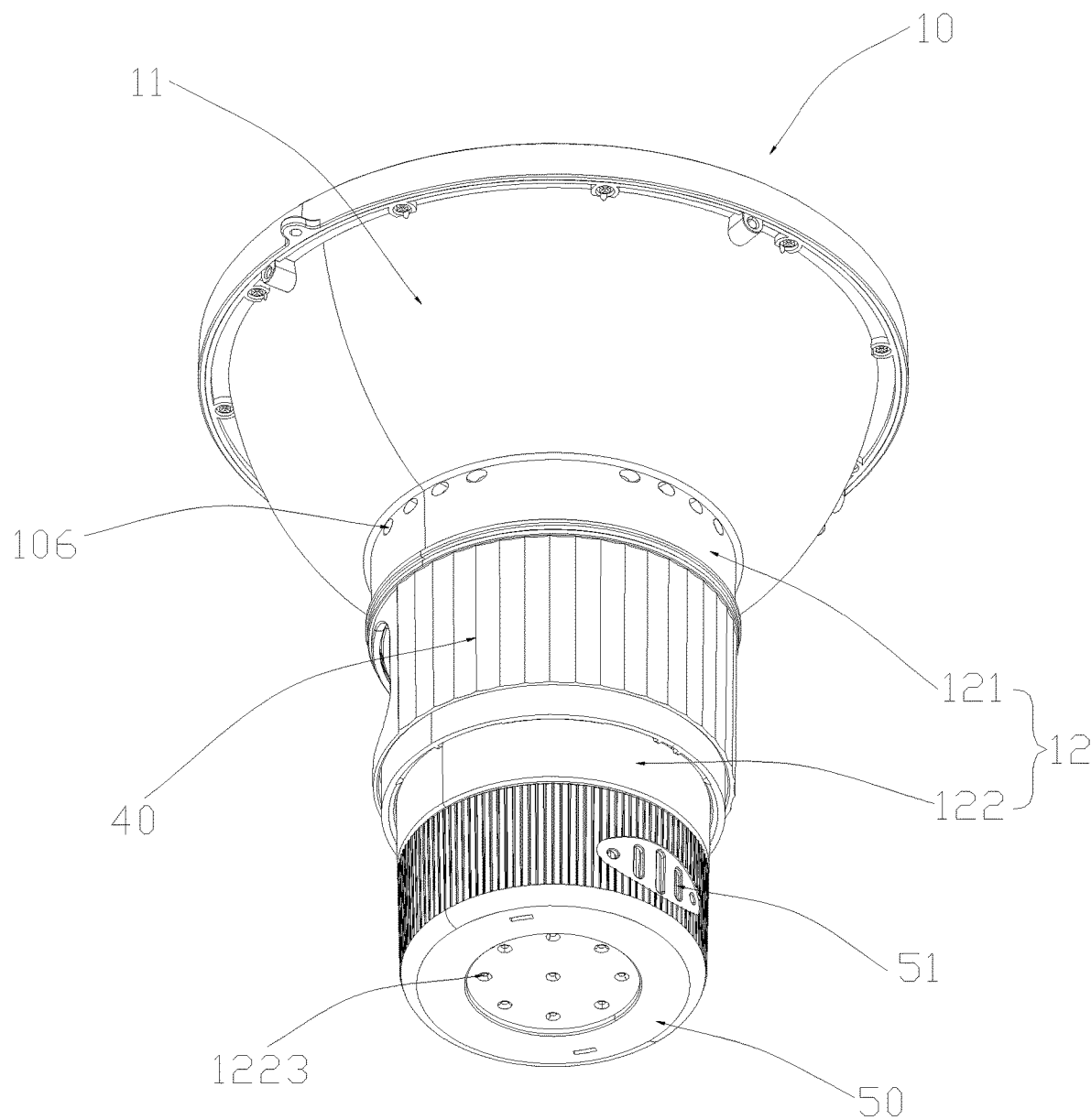
FIG. 2 is a schematic diagram of the overall structure of the present invention viewed from another angle.
Figure 3:
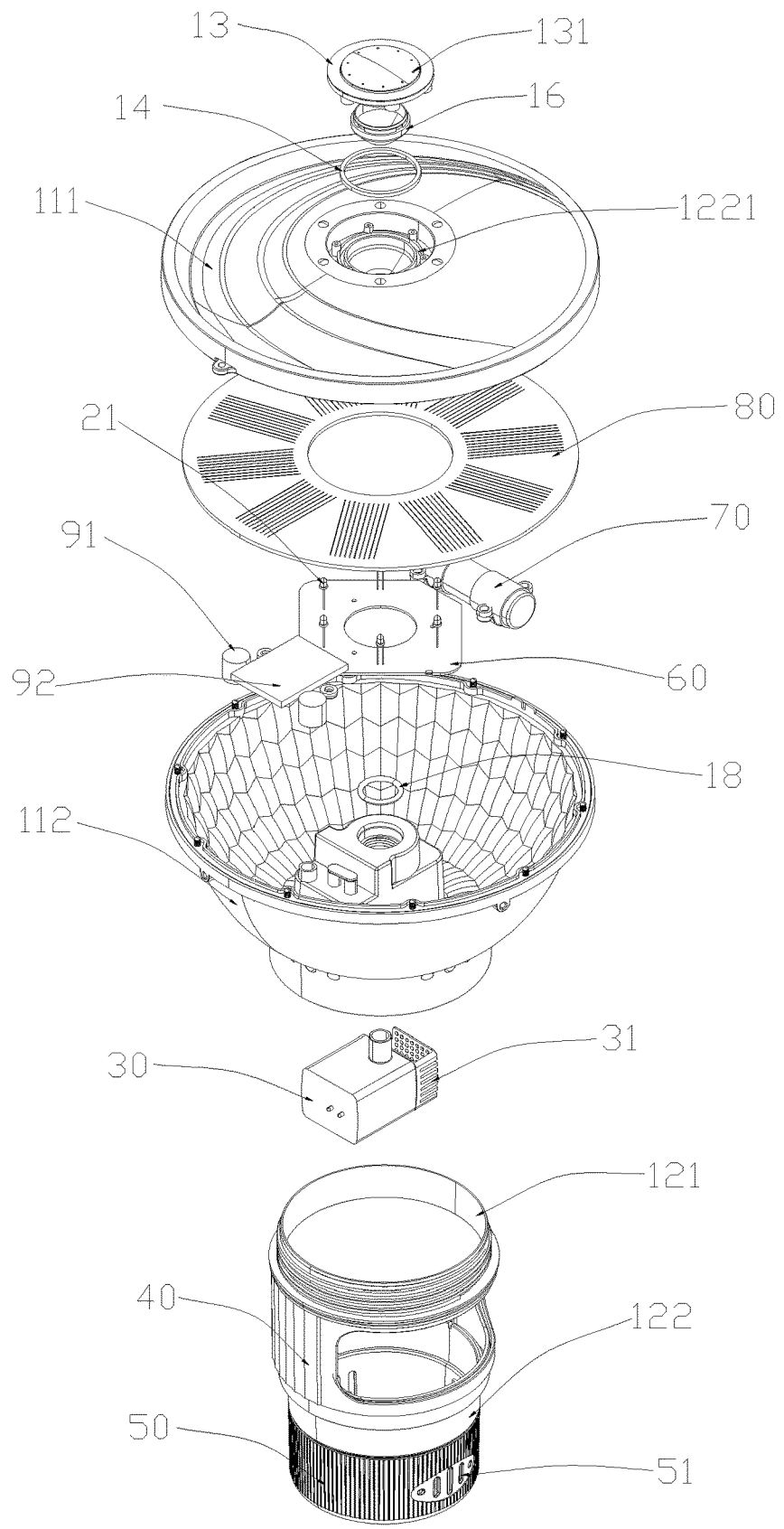
FIG. 3 is a schematic diagram of an exploded structure of the present invention.
Figure 4:
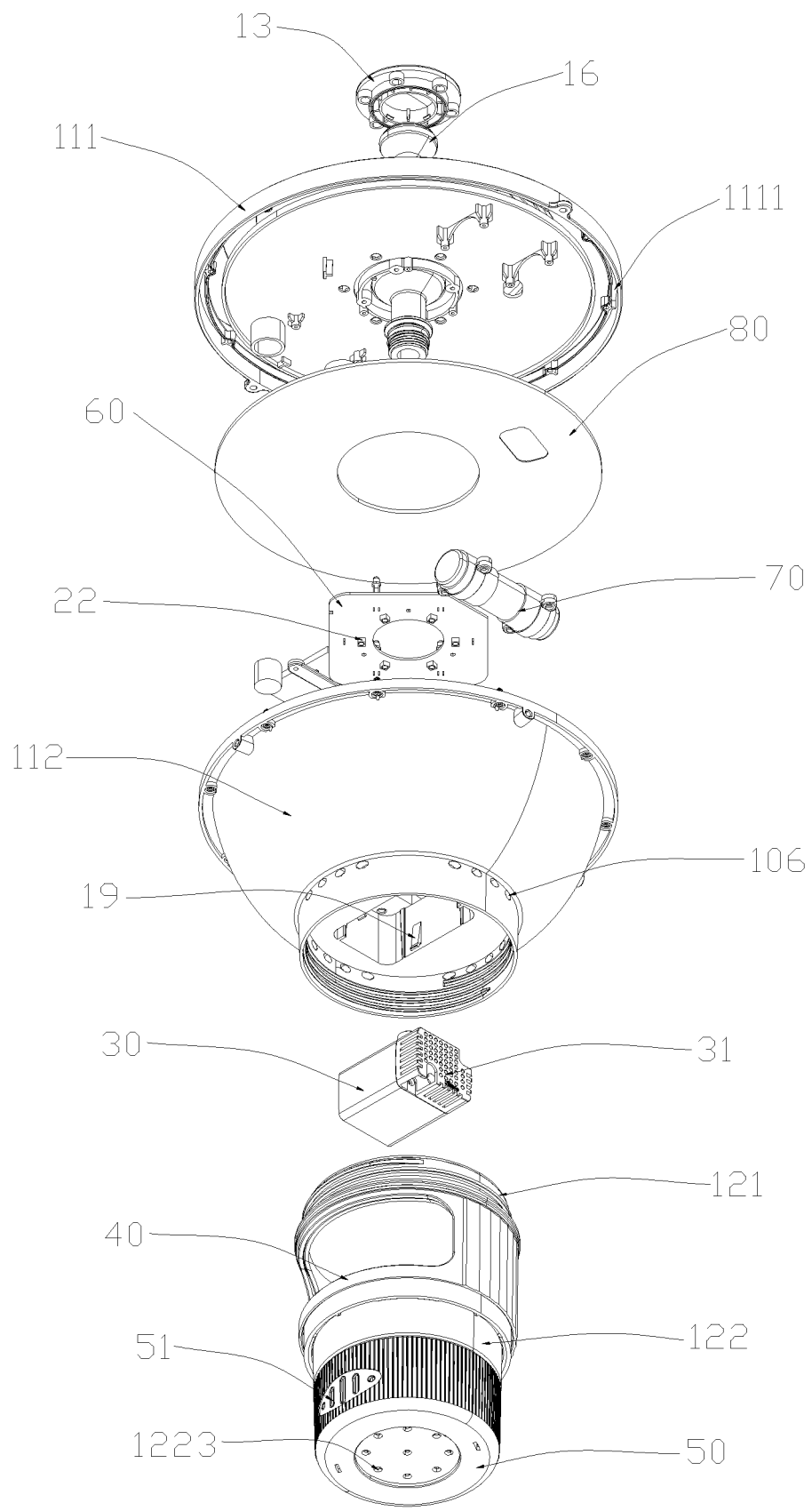
FIG. 4 is a schematic diagram of an exploded structure of another angle of the present invention.
Figure 5:
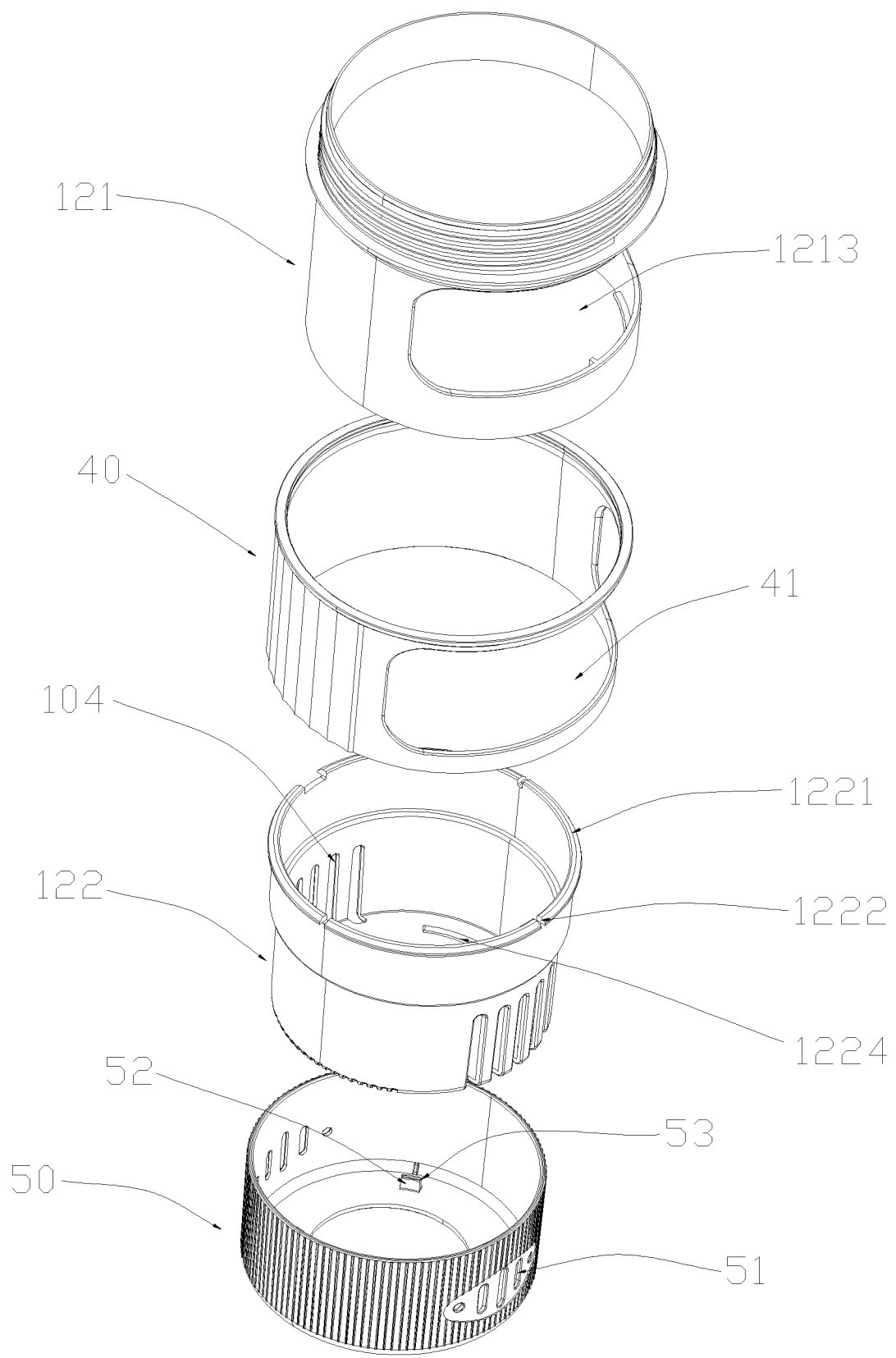
FIG. 5 is a schematic diagram of a partially exploded structure the present invention.
Figure 6:
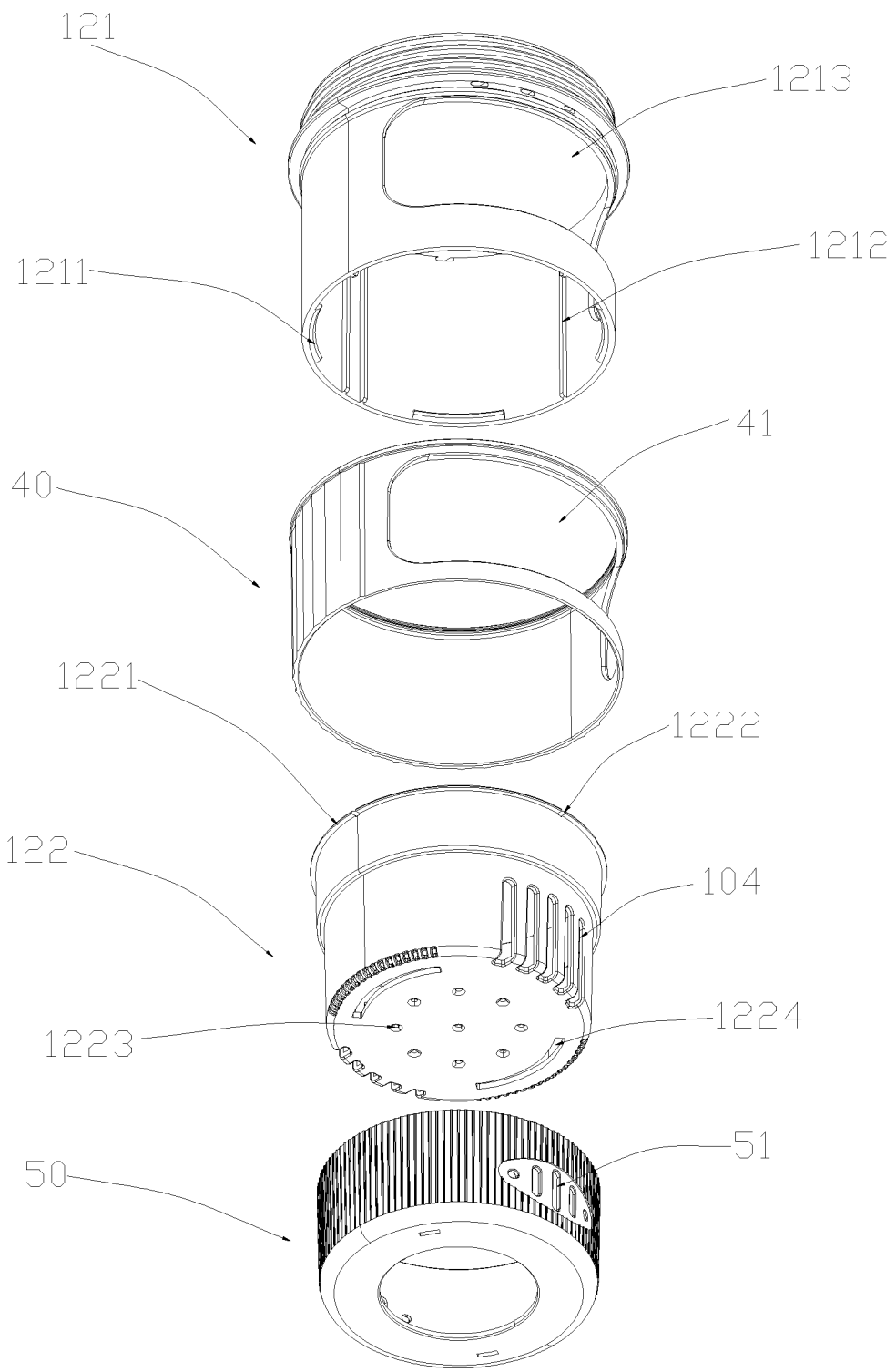
FIG. 6 is a schematic diagram of a partially exploded structure at another angle of the present invention.
Figure 7:
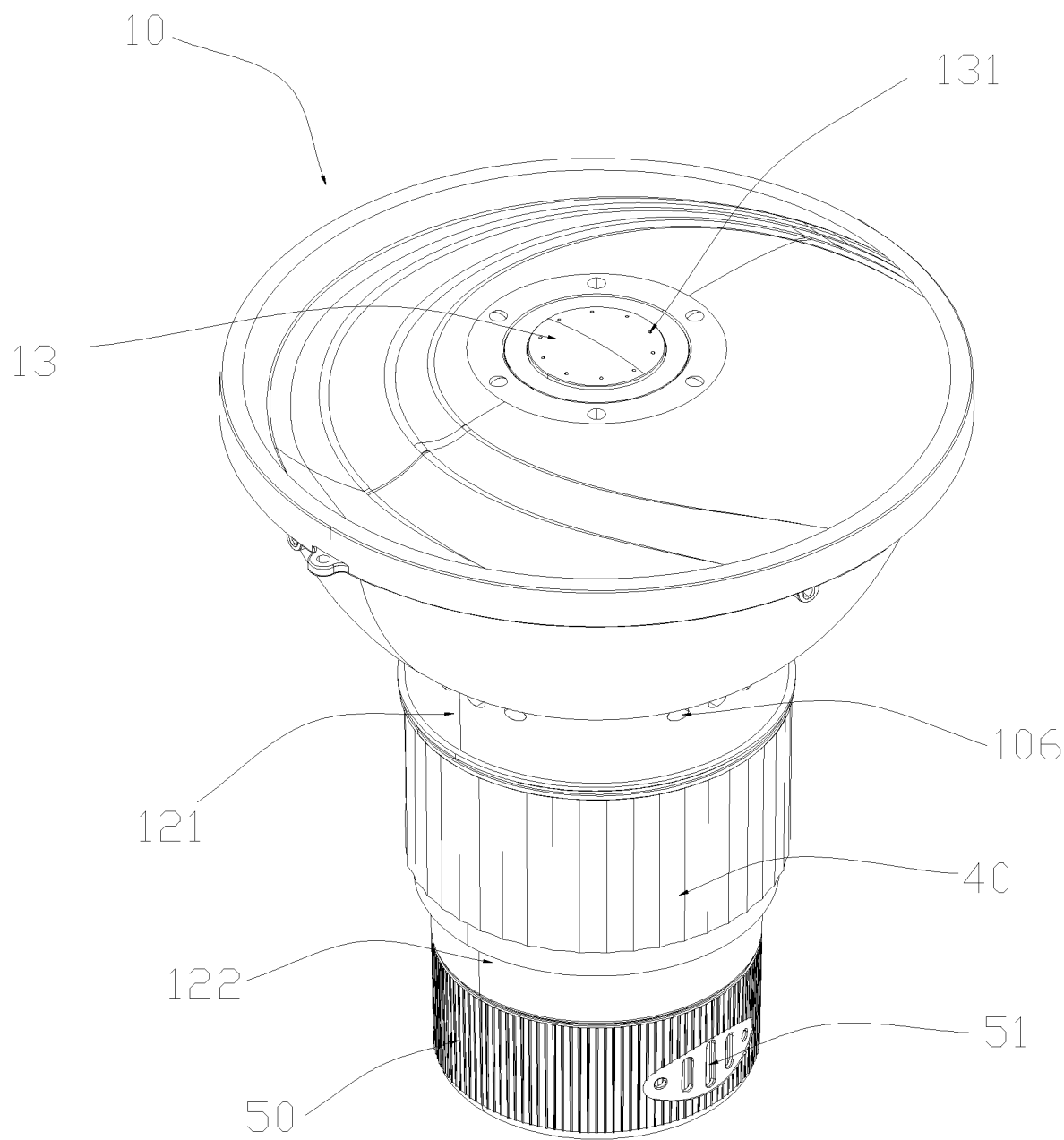
FIG. 7 is a schematic diagram of the overall structure of the present invention with the rotating housing in a closed position and the adjusting housing in an open position.
Figure 8:
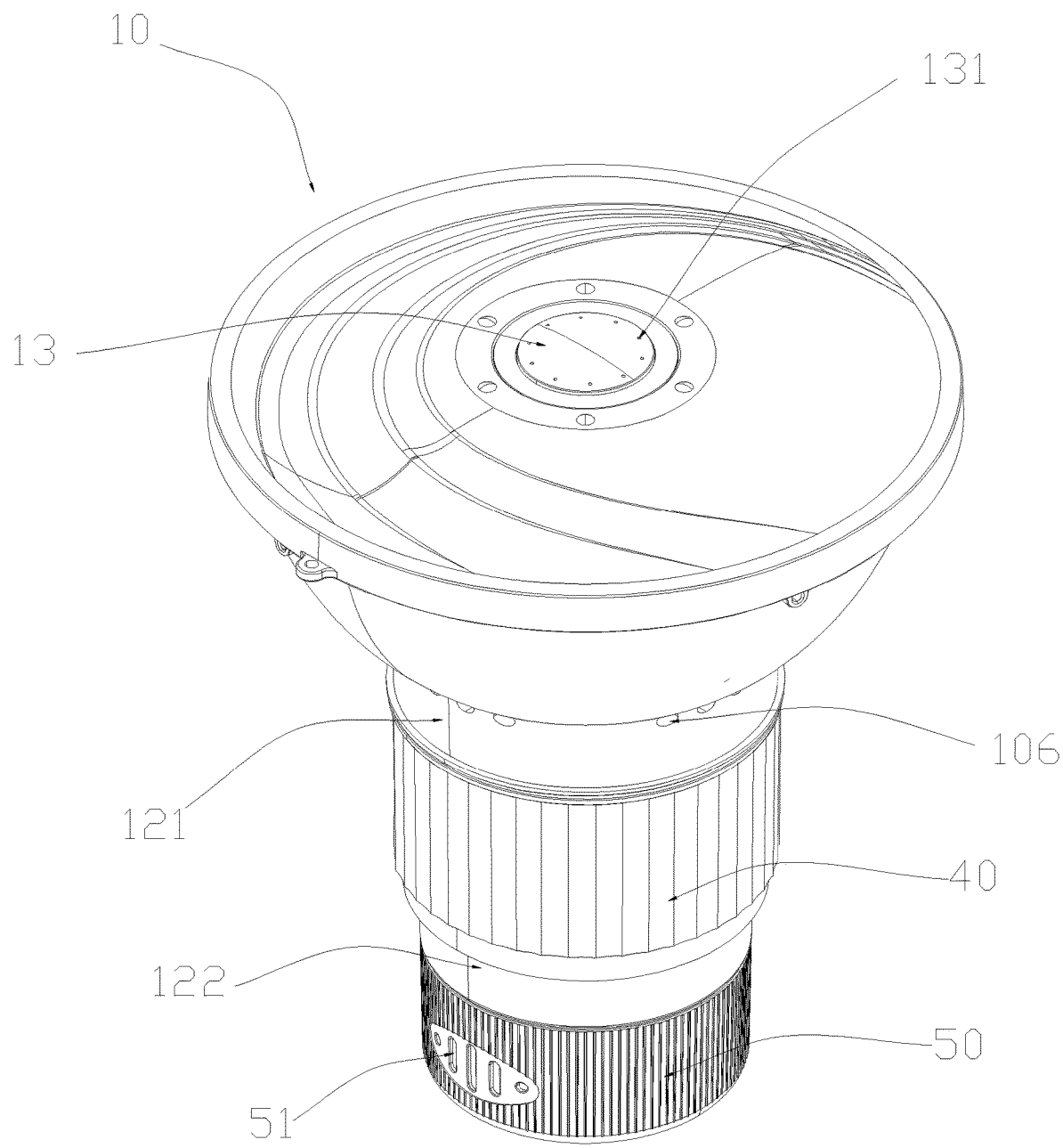
FIG. 8 is a schematic diagram of the overall structure of the present invention with both the rotating housing and the adjusting housing in the closed position.
Figure 9:
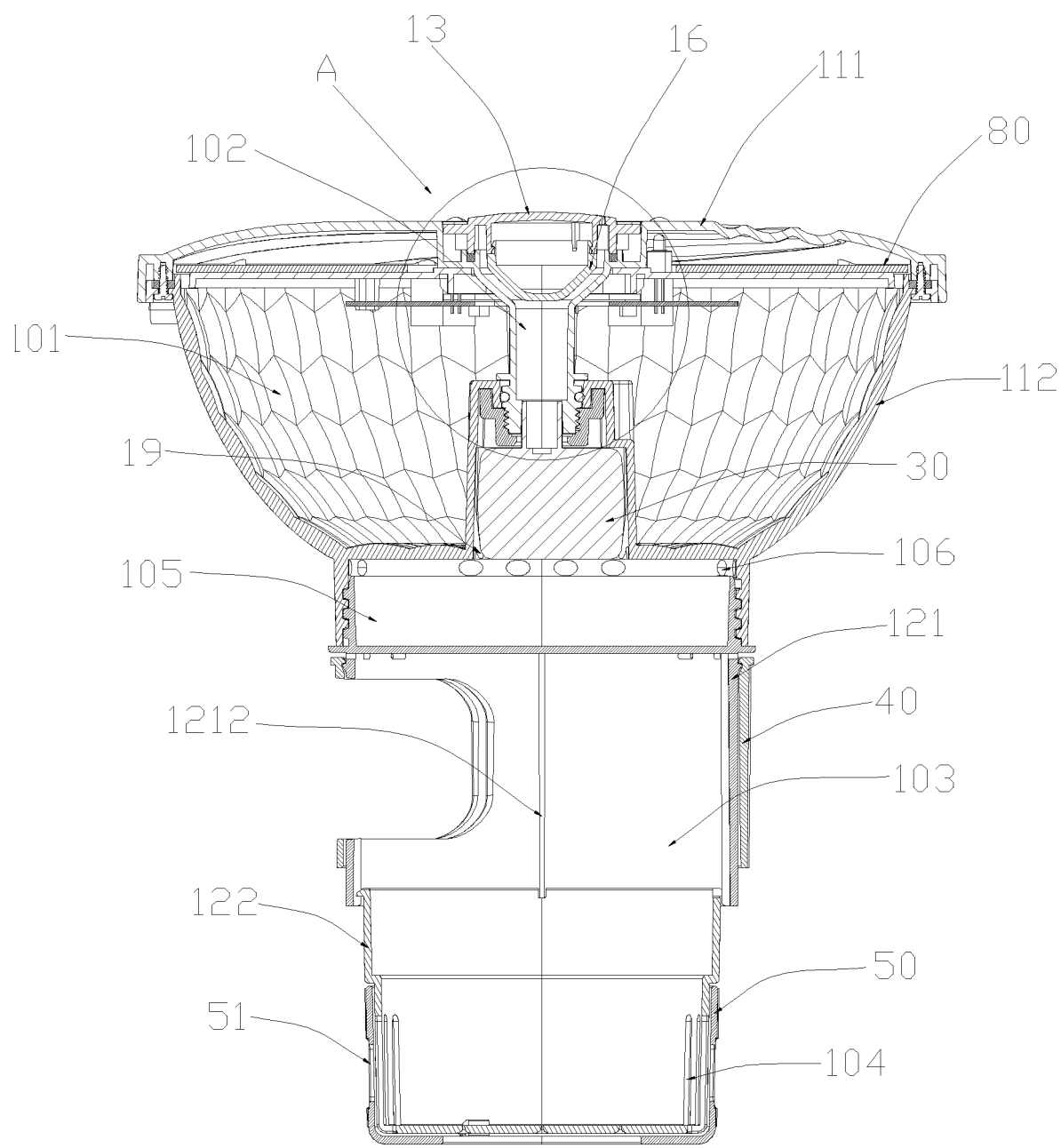
FIG. 9 is a schematic diagram of the sectional view structure of the present invention with the rotating housing and the adjusting housing both in the open position.
Figure 10:
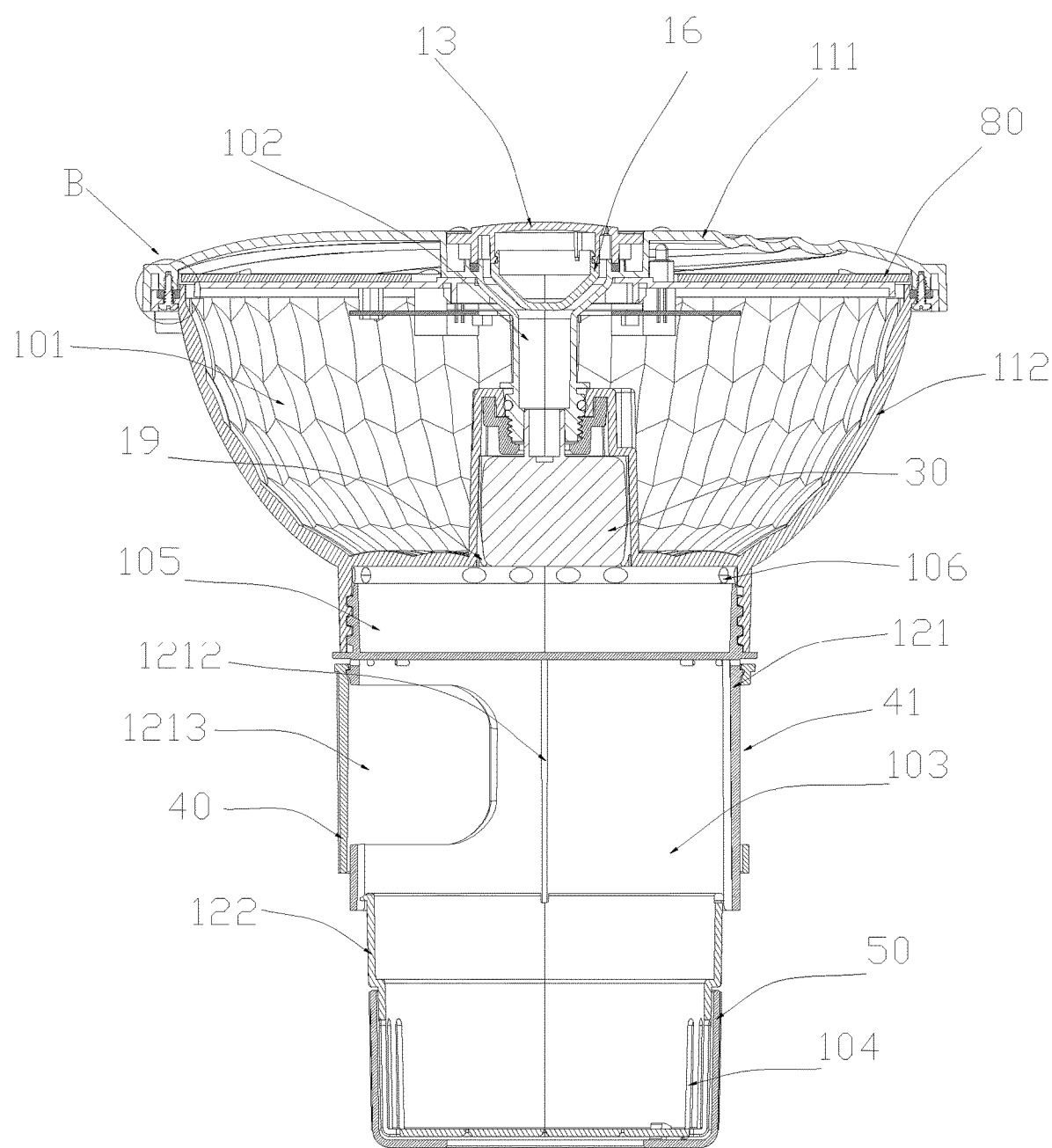
FIG. 10 is a schematic diagram of the sectional view structure of the present invention with both the rotating housing and the adjusting housing in the closed position.
Figure 11:
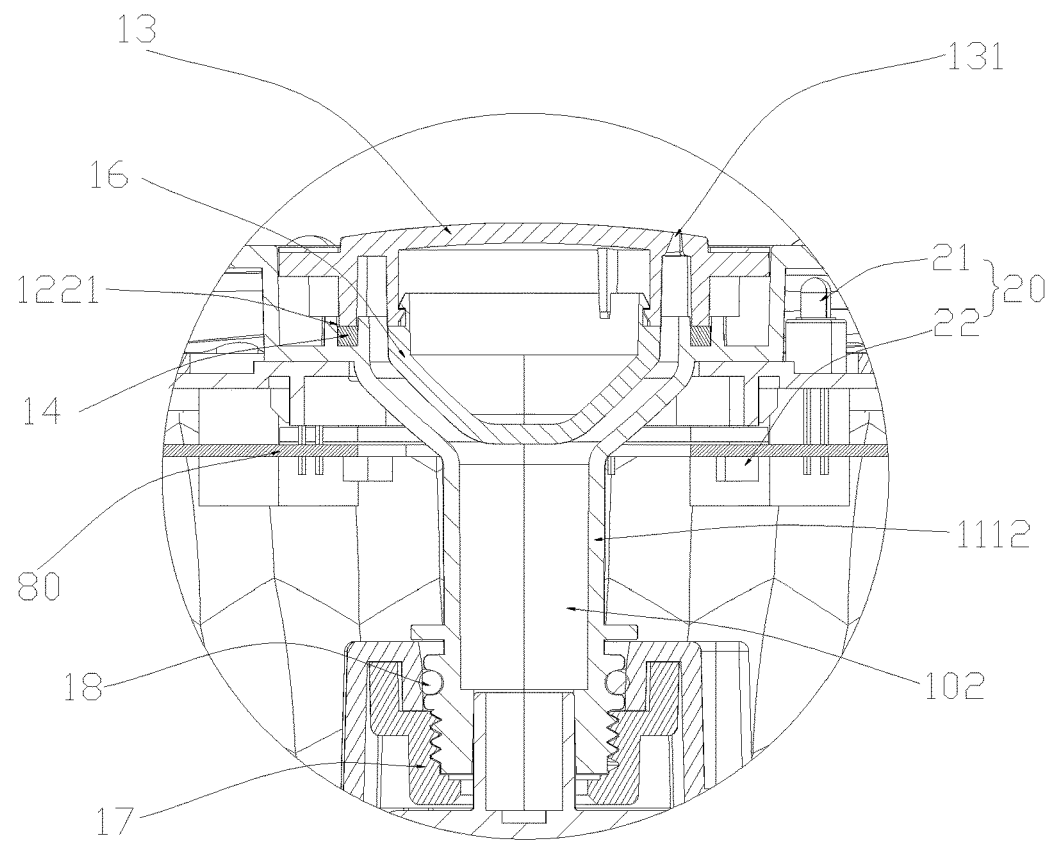
FIG. 11 is an enlarged view at circle A of FIG. 9.
Figure 12:
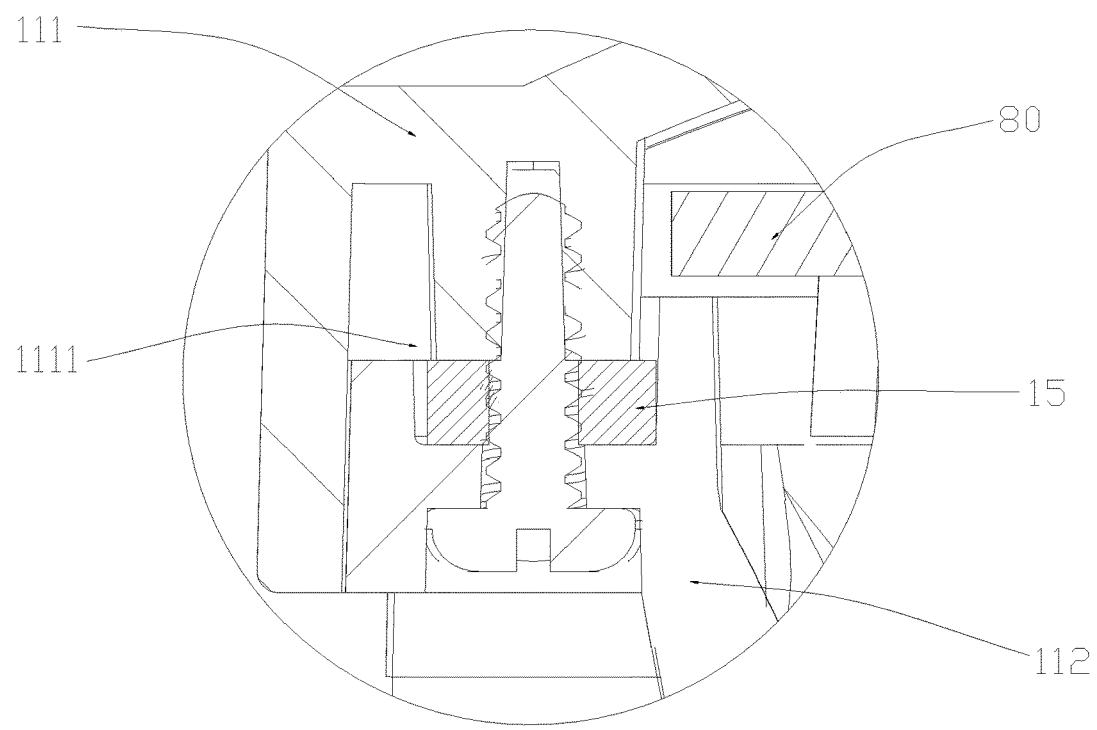
FIG. 12 is an enlarged view at circle B of FIG. 10.
Figure 13:
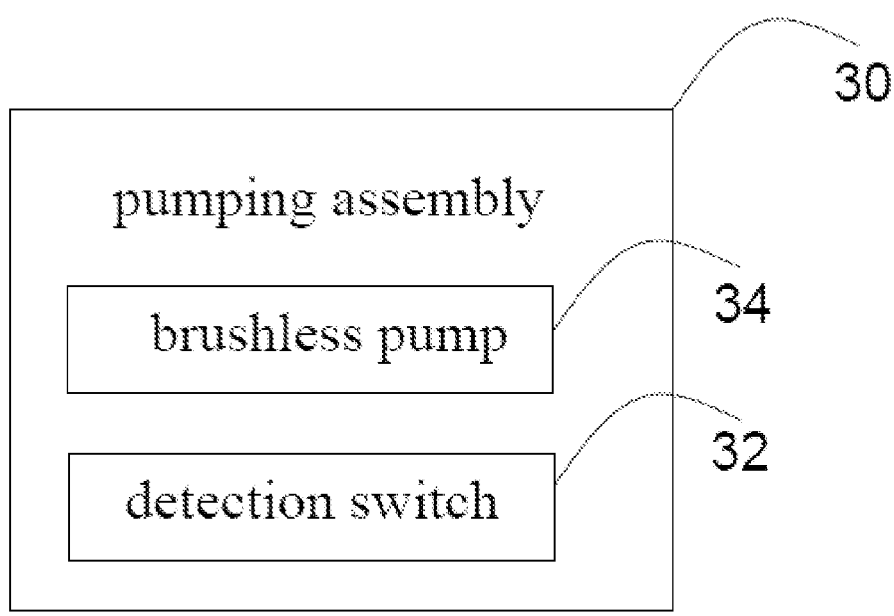
FIG. 13 is a schematic block view of the pumping assembly according to the present invention.

Referring to FIGS. 1 to 13, a fountain light with a disinfection device, includes a housing 10, a lighting assembly 20, and a pumping assembly 30.

The housing 10 is provided in an upper part with a closed floating chamber 101 and a water outlet channel 102 passing through the floating chamber 101. The water outlet channel 102 is provided with a water spray hole 131 at the upper end. The housing 10 is provided in the lower part with a disinfecting chamber 103 and a first through hole 104 in communication with the disinfecting chamber 103. The housing 10 can float on the surface of the water in the presence of the floating chamber 101, and the disinfecting chamber 103 is for holding a sanitizing substance and immersed in water, and the first through hole 104 is for allowing water to pass through.

The lighting assembly 20 is disposed within the floating chamber 101 and for projecting light to form a column of light.

The pumping assembly 30 is provided in a lower portion of the housing 10, the pumping assembly 30 is in communication with the water outlet channel 102, and the pumping assembly 30 is used to pump water through the water outlet channel 102 to the water spray holes 131 to form a column of water.

With the above structure, when in use, the floating chamber 101 is subjected to a buoyancy force of water, so that the product floats on the water, and the lower part of the shell 10 is immersed in the water, and the pumping assembly 30 operates to pump the water through the water outlet channel 102 to the water spray holes 131 to form a sprayed water column. The lighting component 20 works to produce light to be projected to a top of the product to produce light columns, and the light columns overlap with the water columns to provide good lighting and decorative effects. Moreover, the light generated by the lighting assembly 20 also passes through a side wall of the floating chamber 101 and is projected onto the water surface, providing additional lighting and decorative effects. The disinfecting cavity 103 is provided with a disinfecting substance, and the disinfecting substance is immersed in the water, which can disinfect the water, and the first through hole 104 allows the water to pass through, so that the disinfecting substance can be diffused with the water flow. The sanitizing substance is a chloride such as calcium hypochlorite, which can effectively provide chlorine ions to sanitize the water at the swimming pool and the like.

In the present embodiment, the pumping assembly 30 includes a brushless pump 34 and a detection switch 32. The detection switch 32 is used to detect whether water enters an inlet of the brushless pump 34 and to turn the brushless pump 34 on or off. With the above structure, during use, the detection switch 32 can detect whether there is water entering the inlet of the brushless pump 34 and drive the brushless pump 34 to operate if there is water entering the inlet of the brushless pump 34. When the detection switch 32 detects no water entering the inlet of the brushless pump 34, the detection switch 32 can control the brushless pump 34 to turn off, preventing the brushless pump 34 from idling, thereby extending the product's lifespan and ensuring safe use. Moreover, the use of the brushless pump 34 comes with high control accuracy and quick response time, enabling it to respond promptly to the control signals from the detection switch 32. Further, the brushless pump 34 has low energy consumption, long service life, low noise, and stable operation. The brushless pump 34 may be a brushless DC (Direct Current) pump. The brushless DC pump is a machine that uses DC power ranging from 4.5V to 24V to drive a brushless motor. A rotation of the brushless motor in turn drives an impeller, which increases the pressure of the liquid, thereby achieving the function of transferring liquid.

In this embodiment, the lighting assembly 20 includes a first lighting device 21 and a second lighting device 22, the first lighting device 21 is provided on a side of the floating chamber 101 near the upper surface of the housing 10, the first lighting device 21 works to produce a column of light passing through the top of the housing 10, and the column of light is at least partially overlapped with the column of water. The second lighting device 22 operates to produce light projected towards and at least partially penetrating out of the floating chamber 101 sidewall. By the above structure, the first lighting device 21 projects light towards the top of the product to form an upward light column, which is overlapped with the water column to illuminate the water column, so that the water column can flash with the light and have brilliant colors, and the lighting effect is better. The second lighting device 22 can project light towards the side wall of the floating chamber 101, and through the transparent side wall of the floating chamber 101, the light can be projected on the water surface, and the light can be reflected by the water surface to form a more beautiful lighting effect.

In this embodiment, the housing 10 is further provided with an accommodation chamber 105 and a second through hole 106 in communication with the accommodation chamber 105. The accommodation chamber 105 is provided between the floating chamber 101 and the disinfection chamber 103, the pumping assembly 30 is provided in the accommodation chamber 105, and the second through hole 106 is used to allow water to pass through. Through the above structure, the accommodation chamber 105 can receive the pumping assembly 30 and separate the pumping assembly 30 from the disinfecting substance in the disinfecting cavity 103, preventing the pumping assembly 30 from pumping the disinfecting substance, and the two are separately set to slow down the speed of release of the disinfecting substance, prolonging the release time, and effectively disinfecting the inside of the swimming pool and other places. At the same time, the second through hole 106 allows water to pass through, thereby enabling the pumping assembly 30 to always be below the liquid surface, ensuring that the pumping assembly 30 can pump water to form a water column, ensuring the use of the product, and also preventing damage caused by the pumping assembly 30 being separated from the liquid surface, prolonging the service life of the product.

In this embodiment, the fountain lamp further includes a water outlet cover 13. The water spray holes 131 are uniformly distributed in a ring shape along the surface of the water outlet cover 13, the water outlet cover 13 is connected to the top of the housing 10 and covers the water outlet channel 102. Through the above structure, the water spray holes 131 uniformly distributed along the ring shape can form a plurality of water columns to enhance the use of the product effect, while the separate setting of water outlet cover 13 can prevent the pumping assembly 30 from pumping water to form a water column in case of damage caused by the pumping assembly 30 detaching from the liquid surface, thus extending the service life of the product. The water outlet cover 13 can be conveniently replaced when the water spray holes 131 are blocked or damaged, prolonging the service life of the product and reducing the property loss of the user.

In this embodiment, a first sealing ring 14 is also included, the housing 10 is provided with a first sealing groove 1221, the first sealing ring 14 is inserted in the first sealing groove 1221, and the water outlet cover 13 is engaged with the first sealing groove 1221. Through the structure described above, the first sealing ring 14 is inserted in the first sealing groove 1221, which can separate the water spray holes 131 and the water outlet channel 102 from the floating chamber 101 and enhance the product's performance. The floating cavity 101 can separate the water spray holes 131 and the water outlet channel 102 from the floating cavity 101, improve the airtightness of the product, prevent water from entering the floating cavity 101, protect the lighting components 20 and other electrical components set in the floating cavity 101, improve the service life of the product, and ensure the safety of the use of the product.

In this embodiment, the housing 10 includes a floating housing 11 and a disinfection housing 12, the floating chamber 101 is set in the floating housing 11, the disinfection chamber 103 is set in the disinfection housing 12, the disinfection housing 12 is connected to the lower part of the floating housing 11, and the accommodation chamber 105 is formed between the disinfection housing 12 and the floating housing 11. The floating housing 11 and the disinfection housing 12 are separate, and they can be produced separately to improve production efficiency. When in use, the floating housing 11 and the disinfection housing 12 are connected by a threaded structure, and the accommodation chamber 105 is formed between the disinfection housing 12 and the floating housing 11. The fountain lamp is simple in structure and easy to assemble. At the same time, when it is partially damaged, only parts of the product need to be replaced, thus reducing the user's property loss.

In this embodiment, the disinfection housing 12 includes an upper disinfection housing 121 and a lower disinfection housing 122, the upper disinfection housing 121 is sleeved in the lower disinfection housing 122, and the lower disinfection housing 122 is capable of sliding up and down relative to the upper disinfection housing 121 to change a volume of the disinfection chamber 103. Through the above structure, the upper disinfection shell 121 and the lower disinfection shell 122 are nested and connected to each other and can slide relative to each other, so that the size of the disinfection chamber 103 in between can be changed to accommodate different amounts of disinfection substances, to adapt to diversified user needs, and to reduce the volume of the product when transporting, so as to facilitate transportation and storage by the user.

In this embodiment, the upper disinfection housing 121 is provided with a first stop block 1211 in a lower part of the inner surface, the lower disinfection housing 122 is provided with a second stop block 1221 on the upper part of the outer surface, and the first stop block 1211 is coupled with the second stop block 1221. In use, when the lower disinfection housing 122 slides away from the upper disinfection housing 121 to an extreme position (i.e., a limiting position), preventing the upper disinfection housing 121 and the lower disinfection housing 122 from detaching, and improving the stability of the product.

In this embodiment, the upper disinfection housing 121 is provided with a first slider 1212 on the inner surface, the second stop block 1221 is provided with a sliding hole 1222, and the first slider 1212 is slidably disposed in the sliding hole 1222, so that the lower disinfection housing 122 is capable of sliding relative to the upper disinfection housing 121. By the above structure, when in use, the sliding hole 1222 cooperates with the first slider 1212 to enable the upper disinfection housing 121 and the lower disinfection housing 122 to slide relative to each other in an axial direction, restricting the relative movement of the two in a circumferential direction.

In this embodiment, the fountain lamp further includes a rotating housing 40. The rotating housing 40 is provided with a first opening 41, the upper disinfection housing 121 is provided with a second opening 1213, the rotating housing 40 is rotatably coupled to the upper disinfection housing 121 and rotatable between an open position and a closed position. When in the open position, the first opening 41 corresponds to (aligns with) the second opening 1213. In the closed position, the first opening 41 is staggered from the second opening 1213, and the rotating housing 40 is capped over the second opening 1213. By the above structure, the rotating housing 40 can be rotated to adjust the relative positions of the first opening 41 and the second opening 1213 when in use. When the first opening 41 and the second opening 1213 are opposite to each other, they are in the open position, and the user's hand can pass through the first opening 41 and the second opening 1213 to put the sterilized substance into the disinfection chamber 103 or take it out of the disinfection chamber 103. In the closed position, the first opening 41 and the second opening 1213 are staggered, the rotating housing 40 is capped over the second opening 1213, the sterilized substance can be effectively prevented from leaving the disinfection chamber 103 through the first opening 41 and the second opening 1213. Thus, the stability of the product is ensured.

In this embodiment, the fountain lamp further includes an adjusting housing 50. The adjusting housing 50 is provided with an adjusting hole 51, the adjusting housing 50 is rotatably coupled to the lower disinfection housing 122 and rotatable between an open position and a closed position. In the open position, the adjusting hole 51 aligns with the first through hole 104. In the closed position, the adjustment aperture 51 is misaligned with the first through hole 104, and the adjusting housing 50 is capped over the first through hole 104. By the above structure, the adjusting housing 50 can be rotated to adjust the relative position of the adjustment aperture 51 to the first through hole 104 when in use. In the open position, the adjustment hole 51 corresponds to the first through hole 104, more water passes through the adjustment hole 51 and the first through hole 104, and the interaction rate of the water inside and outside of the disinfection chamber 103 can be effectively increased, thereby accelerating the escape rate of the disinfecting substance and improving the disinfection effect of the product. While in the closed position, the adjustment holes 51 and the first through hole 104 are staggered, and less water passes through the adjustment holes 51 and the first through hole 104, at which time the interaction rate of the water inside and outside the disinfection chamber 103 can be reduced, prolonging the time for the disinfecting substances to escape, and improving the duration of the disinfection of the product.

In this embodiment, a third through hole 1223 is provided at the bottom of the lower disinfection housing 122, and the third through hole 1223 is connected to the disinfection chamber 103. Through the above structure, the third through hole 1223 can still allow water to enter and exit the disinfection chamber 103 when the adjustment holes 51 and the first through hole 104 are staggered, so as to realize the interaction of the water inside and outside of the disinfection chamber 103, and thus realizing the escape of disinfecting substances, and guaranteeing the basic disinfection of the product.

In this embodiment, the bottom of the lower disinfection housing 122 is also provided with a curved rotation groove 1224, and the adjusting housing 50 is provided with a second slider 52, and the second slider 52 is slidably engaged in the rotation groove 1224. With the structure described above, when in use, the second slider 52 is located in the rotation groove 1224, which can limit the relative rotation of the adjusting housing 50 and the lower disinfection housing 122 along a circumference, effectively improving the stability of the product.

In the present embodiment, a limiting block 53 is provided at a free end of the second slider 52, and the limiting block 53 abuts against the inner wall of the lower disinfection housing 122. Through the above structure, the restriction block 53 abuts against the inner wall of the lower disinfection housing 122, which can effectively prevent the lower disinfection housing 122 and the adjusting housing 50 from relatively detaching from each other, effectively enhancing the stability of the product.

In this embodiment, the floating housing 11 includes an upper floating housing 111 and a lower floating housing 112, the upper floating housing 111 is connected to and capped on the lower floating housing 112, and the floating cavity 101 is formed between the upper floating housing 111 and the lower floating housing 112. Through the setting of the above structure, the separate setting of the upper floating housing 111 and the lower floating housing 112 may facilitate production and improve the production efficiency of the product, and at the same time, it is also convenient to install the lighting assembly 20 and other electrical components in the floating cavity 101 during assembly, further facilitating production and improving production efficiency.

In this embodiment, a second sealing ring 15 is also included, the upper floating housing 111 is provided with a second sealing groove 1111, the second sealing ring 15 is provided in the second sealing groove 1111, and the lower floating housing 112 is inserted along the second sealing groove 1111 and is pressed against the second sealing ring 15. Through the structure described above, the second sealing ring is inserted into the second sealing groove 1111, and the lower floating housing 112 is inserted along the second sealing groove 1111, and the lower floating housing 112 is pressed against the second sealing ring 15. Through the above structure, the second sealing ring is inserted into the second sealing groove 1111, and the lower floating housing 112 is connected to the second sealing ring 15, which can effectively limit the second sealing ring 15, thereby enhancing the airtightness of the product, preventing water from entering the floating cavity 101, protecting the lighting components 20 and other electrical components set inside the floating cavity 101, enhancing the service life of the product, and safeguarding the safety of the use of the product.

In this embodiment, a middle part of the upper floating housing 111 extends downward to form a connecting portion 1112, the water outlet channel 102 is provided in the connecting portion 1112, the connecting portion 1112 is connected to the middle of the lower floating housing 112 through a connection member 17, and a third sealing ring 18 is provided between the connecting portion 1112 and the lower floating housing 112. The connecting portion 1112 is provided with a third sealing ring 18 between the portion 1112 and the lower floating housing 112, which can further enhance the airtightness of the product and safeguard the use of the product.

In this embodiment, the fountain lamp further includes a blocking member 16, the blocking member 16 is detachably connected to the lower surface of the water outlet cover 13 and inserted into the water outlet channel 102, so as to form a water outlet gap connecting to the water spray hole 131 between the inner wall of the water outlet channel 102 and the outer wall of the blocking member 16. Through the above structure, the blocking member 16 can block part of the water outlet channel 102 and form a water outlet gap between the inner wall of the water outlet channel 102, increase the water pressure of the water flow through the water outlet gap, and thus make the water pressure at the water jet hole 131 greater, so that the water column sprayed from the water spray hole 131 can spray higher and improve the use effect of the product.

In this embodiment, the inner wall of the accommodation chamber 105 is provided with a snap-in member 19, the snap-in member 19 is coupled with the outer surface of the pumping assembly 30. Through the above structure, when in use, the pumping assembly 30 is inserted toward the accommodation chamber 105 until the installation position. The snap-in member 19 is coupled to the outer surface of the pumping assembly 30. This engagement can effectively fix the pumping assembly 30, facilitate product assembly, and improve the production efficiency of the product.

In this embodiment, the pumping assembly 30 is provided with a filtering section 31 on the side near the water inlet, and the filtering section 31 is used to filter impurities in the water. Through the above structure, the filtering section 31 can effectively filter impurities, prevent excessive impurities from entering the water inlet of the pumping assembly 30, protect the safety of the pumping assembly 30, and thus safeguard the safety of the use of the product.

In this embodiment, the fountain lamp further includes a control component 60 and a battery 70, the control component 60 and the battery 70 are both provided in the floating cavity 101. The control component 60 is electrically connected to the battery 70, the lighting component 20 and the pumping assembly 30. Through the setting of the above structure, the battery 70 can provide electrical energy, improve the endurance of the product, and make the product can be detached from the utility power for use, convenient for users to carry, and increase the safety of the product. The control assembly 60 can control the lighting assembly, and the pumping assembly 30 can control the lighting assembly, and the pumping assembly 30 can control the lighting assembly. The control component 60 can control the lighting components to produce different lighting effects, and also allows the user to realize human-computer interaction through a button or a remote controller to improve the user's experience.

In this embodiment, the fountain lamp also includes a solar panel 80, the solar panel 80 is set at the top of the floating cavity 101, and the solar panel 80 is electrically connected to the control component 60. Through the above structure, the solar panel 80, when in use, can convert solar energy into electrical energy, and through the control device converts the voltage to store the electrical energy to the battery 70, which can effectively enhance the range of the product, and it can save energy.

In this embodiment, the fountain lamp also includes a counterweight block 91, and the counterweight block 91 is arranged in the floating cavity 101 and connected to the inner wall of the floating cavity 101. Through the above structure, the counterweight block 91 can lower a center of gravity of the product, so that the product can maintain balance when floating on the water surface and will not topple over, so as to safeguard the stability of the product, especially when the pumping assembly 30 is pumping water.

In this embodiment, the fountain lamp also includes a drying block 92, the drying block 92 is provided in the floating cavity 101, and connected to the inner wall of the floating cavity 101. Through the above structure, the drying block 92 can adsorb and remove the moisture inside the floating cavity 101, further safeguarding the dryness inside the floating cavity 101, preventing the electrical components inside the floating cavity 101 from being damp, improving the service life of the product, and safeguarding the user's safety of use.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A fountain lamp with a disinfection device, comprising:
  a shell, the shell being provided with a closed floating cavity in an upper part and a water outlet channel passing through the floating cavity, the water outlet channel being provided with a water spray hole at an upper end, the shell being further provided with an accommodation chamber, a disinfecting cavity at a lower part and a first through hole at the lower part, the first through hole being in communication with the disinfecting cavity, the shell being floatable on water under an action of the floating cavity, the disinfecting cavity being for receiving disinfecting substance and immersing the disinfecting substance in the water, and the first through hole for allowing water to pass through, wherein the shell comprises a floating housing, and a disinfection housing, the floating cavity is arranged in the floating housing, the disinfection cavity is arranged in the disinfection housing, the disinfection housing is connected to a lower part of the floating housing, the accommodation chamber is formed between the disinfection housing and the floating housing; and the disinfection housing comprises an upper disinfection housing and a lower disinfection housing, the upper disinfection housing sleeves the lower disinfection housing, the lower disinfection housing being slidable up and down with respect to the upper disinfection housing in order to change a disinfection volume of the disinfection chamber;
  a lighting component, the lighting component being arranged inside the floating cavity and configured for projecting light to form a column of light; wherein the floating housing is provided with protruding polygonal optical structures configured to adjust lighting effect of the lighting component;
  a pumping assembly, the pumping assembly being located in the accommodation chamber, the pumping assembly being connected to the water outlet channel, and the pump component being used for pumping water through the water outlet channel to the water spray hole to form a column of water; wherein the accommodation chamber comprises a plurality of second through holes in communication therein, and the second through holes allows water to pass through, thereby enabling the pumping assembly to always be below a liquid surface, ensuring that the pumping assembly can pump water to form a water column; and
  an adjusting housing, wherein the adjusting housing is provided with adjusting holes, the adjusting housing rotatably is sleeved outside the lower disinfection housing and is rotatable between an open position and a closed position; when in the open position, the adjusting holes align with the first through hole; in the closed position, the adjustment holes is misaligned with the first through hole, and the adjusting housing covers the first through hole, and the lower disinfection housing is provided with a third through hole at a bottom of the lower disinfection housing, and the third through hole is in communication with the disinfection chamber, and configured for still allowing water to enter and exit the disinfection chamber when the adjustment holes are misaligned with the first through hole; the adjusting housing is further provided with a bottom hole running through a bottom of the adjusting housing, the third through hole is exposed through the bottom hole.

2. The fountain lamp according to claim 1, wherein the pumping assembly comprises a brushless pump and a detection switch, the detection switch is configured for detecting whether water enters the brushless pump and turning on or off the brushless pump.

3. The fountain lamp according to claim 1, wherein the lighting assembly comprises a first lighting device and a second lighting device, the first lighting device is provided on a side of the floating cavity adjacent to the upper surface of the shell, the first lighting device is configured for producing a light column through the top of the shell, the light column at least partially overlaps with the water column; the second lighting device is for generating light projected towards a side wall of the floating cavity, and the light at least partially penetrating out of the side wall of the floating cavity.

4. The fountain lamp according to claim 1, wherein the fountain lamp further comprises a water outlet cover, the water spray holes being uniformly distributed in a circular shape along the surface of the water outlet cover, the water outlet cover being connected to the top of the shell and capped over the water outlet channel.

5. The fountain lamp according to claim 4, further comprising a first sealing ring, wherein the shell is provided with a first sealing groove, the first sealing ring being inserted in the first sealing groove, the water outlet cover being pressed against the first sealing groove.

6. The fountain lamp according to claim 4, wherein the fountain lamp further comprises a blocking member, the blocking member being detachably connected to the lower surface of the outlet cover body and inserted into the outlet channel, so as to form a water outlet gap between the inner wall of the outlet channel and the outer wall of the blocking member, which is connected to the water spray hole of the water outlet gap.

7. The fountain lamp according to claim 1, wherein the upper disinfection housing is provided with a first stop block in the lower part of the inner surface, the lower disinfection housing is provided with a second stop block in the upper part of the outer surface, and the first stop block abuts against the second stop block.

8. The fountain lamp according to claim 7, wherein the upper disinfection housing is provided with a first slider on an inner surface thereof, the second stop block is provided with a sliding hole, and the first slider is slidable disposed in the sliding hole so that the lower disinfection housing can slide relative to the upper disinfection housing.

9. The fountain lamp according to claim 1, further comprising a rotating housing, wherein the rotating housing is provided with a first opening, the upper disinfecting housing being provided with a second opening, the rotating housing being rotatably sleeved in the upper disinfecting housing and rotatable between an open position and a closed position rotating; in the open position, the first opening aligns with the second opening; and in the closed position, the first opening is staggered from the second opening, and the rotating housing covers the second opening.

10. The fountain lamp according to claim 1, wherein the lower disinfection housing is further provided with a curved rotation groove at a bottom of the lower disinfection housing, and the adjusting housing is provided with a second slider at the bottom of the adjusting housing, and the second slider is slidably disposed in the rotation groove.

11. The fountain lamp according to claim 10, wherein a free end of the second slider is provided with a limiting block, and the limiting block abuts against the inner wall of the lower disinfection housing.

12. The fountain lamp according to claim 10, wherein the bottom of the adjusting housing defines the bottom hole in a centre thereof and forms a bottom ring plate surrounding the bottom hole, the second slider is a protruding block disposed on an inner surface of the bottom ring plate.

13. The fountain lamp according to claim 1, wherein the floating housing comprises an upper floating housing and a lower floating housing, the upper floating housing is connected to and capped in the lower floating housing, and the floating cavity is formed between the upper floating housing and the lower floating housing; the protruding polygonal optical structures are provided on an inner wall of the lower floating housing.

14. The fountain lamp according to claim 13, wherein the fountain lamp further comprises a second sealing ring, the upper floating housing is provided with a second sealing groove, the second sealing ring is arranged in the second sealing groove, the lower floating housing is inserted along the second sealing groove, and the lower floating housing abuts against the second sealing ring.

15. The fountain lamp according to claim 13, wherein the upper floating housing extends downwardly in the middle to form a connecting portion, the water outlet channel is provided in the connecting portion, the connecting portion is connected to the middle of the lower floating housing by a connecting member, and a third seal is provided between the connecting portion and the lower floating housing.

16. The fountain lamp according to claim 1, wherein the inner wall of the accommodation chamber is provided with a snap-in member, and the snap-in member is engaged on the outer surface of the pumping assembly.

17. A fountain lamp with a disinfection device, comprising:

a shell, the shell being provided with a closed floating cavity in an upper part and a water outlet channel passing through the floating cavity, the water outlet channel being provided with a water spray hole at an upper end, the shell being further provided with an accommodation chamber, a disinfecting cavity at a lower part and a first through hole at the lower part, the first through hole being in communication with the disinfecting cavity, the shell being floatable on water under an action of the floating cavity, the disinfecting cavity being for receiving disinfecting substance and immersing the disinfecting substance in the water, and the first through hole for allowing water to pass through, wherein the shell comprises a floating housing, and a disinfection housing, the floating cavity is arranged in the floating housing, the disinfection cavity is arranged in the disinfection housing, the disinfection housing is connected to a lower part of the floating housing, the accommodation chamber is formed between the disinfection housing and the floating housing; and the disinfection housing comprises an upper disinfection housing and a lower disinfection housing, the upper disinfection housing sleeves the lower disinfection housing, the lower disinfection housing being slidable up and down with respect to the upper disinfection housing in order to change a disinfection volume of the disinfection chamber;

a lighting component, the lighting component being arranged inside the floating cavity and configured for projecting light to form a column of light; wherein the floating housing is provided with protruding polygonal optical structures configured to adjust lighting effect of the lighting component;

a pumping assembly, the pumping assembly being located in the accommodation chamber, the pumping assembly being connected to the water outlet channel, and the pump component being used for pumping water through the water outlet channel to the water spray hole to form a column of water; and an adjusting housing, wherein the adjusting housing is provided with adjusting holes, the adjusting housing rotatably is sleeved outside the lower disinfection housing and is rotatable between an open position and a closed position; when in the open position, the adjusting holes align with the first through hole; in the closed position, the adjustment holes is misaligned with the first through hole, and the adjusting housing covers the first through hole, and the lower disinfection housing is provided with a third through hole at a bottom of the lower disinfection housing, and the third through hole is in communication with the disinfection chamber, and configured for still allowing water to enter and exit the disinfection chamber when the adjustment holes are misaligned with the first through hole; the adjusting housing is further provided with a bottom hole running through a bottom of the adjusting housing, the third through hole is exposed through the bottom hole.

* * * * *